FLIP-FLOP

Filed March 12, 1956 2 Sheets-Sheet 1

INVENTORS
ROBERT F. CASEY
JOHN GIBBON
BY E J Sight
ATTORNEY

INVENTORS
ROBERT F. CASEY
JOHN GIBBON
BY E. J. Knight
ATTORNEY

United States Patent Office 2,921,192

Patented Jan. 12, 1960

2,921,192

FLIP-FLOP

Robert F. Casey, Pompton Plains, and John Gibbon, Morristown, N.J., assignors to Monroe Calculating Machine Company, Orange, N.J., a corporation of Delaware Application March 12, 1956, Serial No. 570,981

3 Claims. (Cl. 250—27)

This invention relates to bi-stable circuits for use as triggers or the like and more praticularly to flip-flop circuits having low output impedance.

A flip-flop circuit may be defined as an Eccles-Jordan or direct-coupled multivibrator having two conditions of stable equilibrium. Generally a flip-flop circuit is a triggered circuit having two stable limiting conditions into which the circuit is alternately triggered by a trigger pulse. A flip-flop circuit, for example, may find use in electronic digital computers. When so used, the output or outputs from a flip-flop serve as input or inputs to other flip-flops, to gates, to buffers and to combinations of these elements.

Most flip-flops are critical in that the source impedance is high and loading of the output may cause instability either by reducing the loop gain therein or by shifting the D.C. operating potentials therefor. It has heretofore been common to use additional elements, such as driver-amplifiers, between the output or outputs of a flip-flop circuit and the elements to be driven thereby. The additional elements result in circuit complexities which it is desired to keep to a minimum.

It is the object of this invention to provide a bi-stable circuit having low impedance output at potentials suitable for directly driving other flip-flops, gates, etc.

It is another object of this invention to provide a flip-flop circuit of minimum complexity in which the loop gain cannot be reduced below critical levels by passive loading and D.C. operating levels are maintained substantially constant over wide operating ranges of load.

These and further objects of the invention will become apparent to those skilled in the art from the following specification read in conjunction with the drawings in which.

Figures 1, 3, 4:
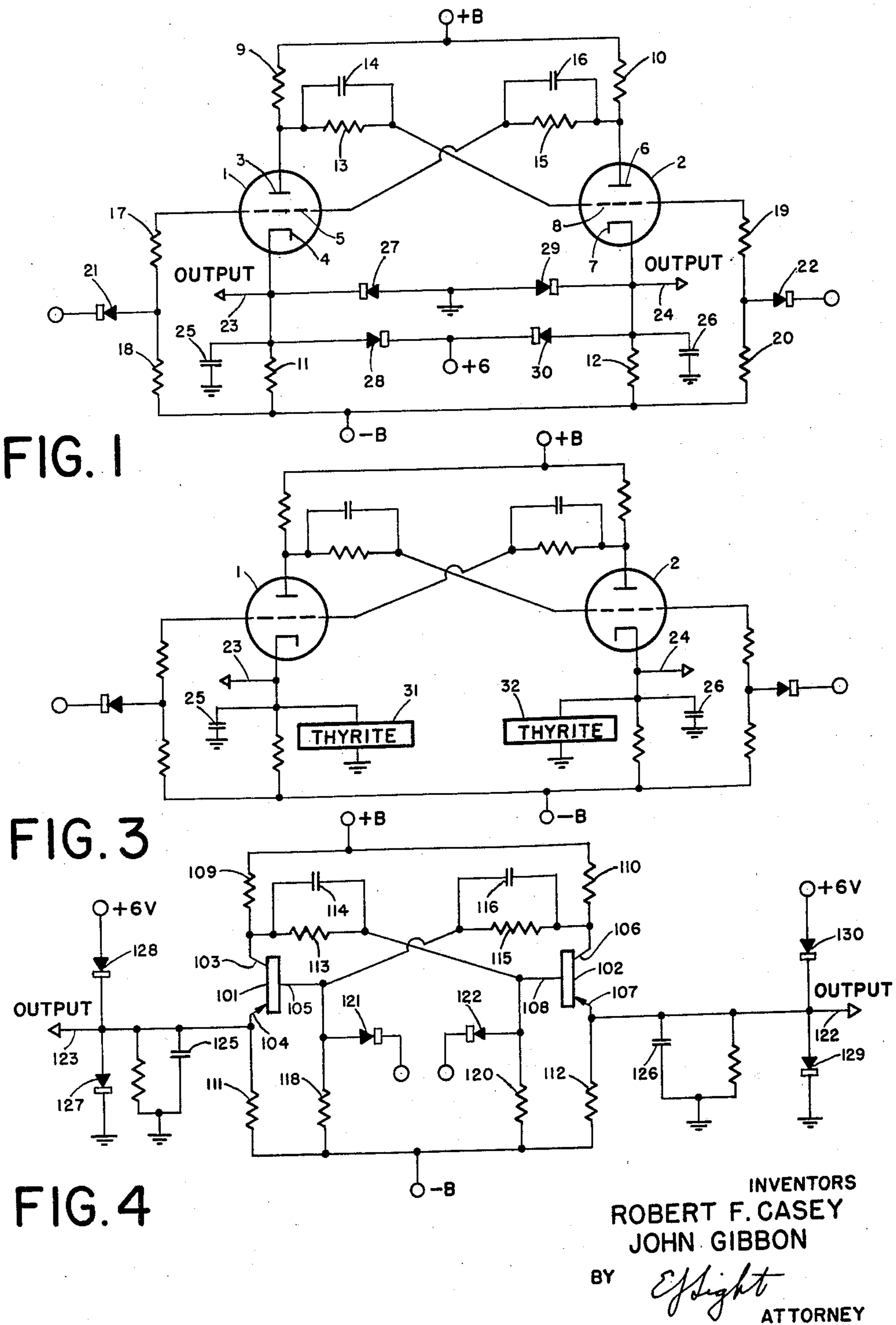
Figure 1 is a circuit diagram of an embodiment of the invention.
Figure 3 is a circuit diagram of a modification of the embodiment of the invention shown in Figure 1.
Figure 4 is a circuit diagram of a further modification of the invention.

Referring to Figure 1 there is illustrated a flip-flop circuit comprising a pair of electron discharge devices 1 and 2. Device 1 is provided with an electron collecting electrode or anode 3, an electron emitting electrode or cathode 4 and a control electrode or grid 5, and device 2 is provided with an electron collecting electrode or anode 6, an electron emitting electrode or cathode 7 and a control electrode or grid 8. A pair of load resistors 9 and 10 are connected in the anode circuits of devices 1 and 2, respectively, connected between the respective anodes and a soure of potential indicated as +B. The cathode 4 of device 1 is connected through a resistor 11 to a source of potential negative with respect to the anode potential source indicated as —B while the cathode 7 of device 2 is connected through a resistor 12 to said source —B. The anode 3 of device 1 is coupled to the grid 8 of device 2 via a coupling network comprising a resistor 13 and capacitor 14, connected in parallel, and the anode 6 of device 2 is coupled to the grid 5 of device 1 via a coupling network comprising a resistor 15 and capacitor 16, connected in parallel. The grid 5 of device 1 is further connected through resistors 17 and 18 to the —B source, and the grid 8 of device 2 is further connected through resistors 19 and 20 to the —B source. An input for negative going trigger pulses is provided to the grid 5 of device 1 via diode 21 having its anode connected to the junction of resistors 17 and 18, and an input for negative going trigger pulses is provided to the grid 8 of device 2 via diode 22 having its anode connected to the junction of resistors 19 and 20. The grid voltage of each of devices 1 and 2 is thus controlled by a voltage dividing network which for device 1 consists of resistors 15, 17 and 18 and for device 2 consists of resistors 13, 19 and 20.

Outputs are taken from the cathode of each device and are indicated as 23 and 24, respectively. A condenser 25 is connected between the output 23 and a source of potential between +B and —B, here indicated as ground, and a condenser 26 is connected between the output 24 and said ground potential. The outputs 23 and 24 are clamped by diodes 27 and 28 and diodes 29 and 30, respectively, for an output between the potential to which consensers 25 and 26 are connected and a potential positive thereto, as indicated, between ground potential and +6 volts.

Assume device 1 is non-conducting and device 2 is conducting. The cathode 7 of device 2 is clamped to +6 volts, and condenser 26 is charged to +6 volts, and, since the grid 8 is drawing current, grid 8 is also at +6 volts. The cathode 4 of device 1 is clamped to ground, and condenser 25 is not charged. Circuit components may be so chosen that the potential between resistors 19 and 20 is +3 volts and the potential between resistors 17 and 18 is —10 volts.

If now a pulse negative-going from +6 volts is applied to the cathode of diode 22 as shown in the top line of Figure 2 there will be no change of condition unless and until the pulse applied to diode 22 drops below +3 volts. At this instant the potential of grid 8 is pulled down by the pulse applied to diode 22 and since the cathode resistor 12 is bypassed by condenser 26, the current in device 2 cuts off rapidly which effect, through coupling network 15—16, brings device 1 rapidly into conduction to complete the switching action of conduction from device 2, to device 1. After conduction has switched from device 2 to device 1, the cathode potentials will proceed to their steady state potentials during the time required to discharge condenser 26 and to charge condenser 25. The potentials present at the cathodes 4 and 7 are applied as outputs 23 and 24, respectively.

Figure 2:
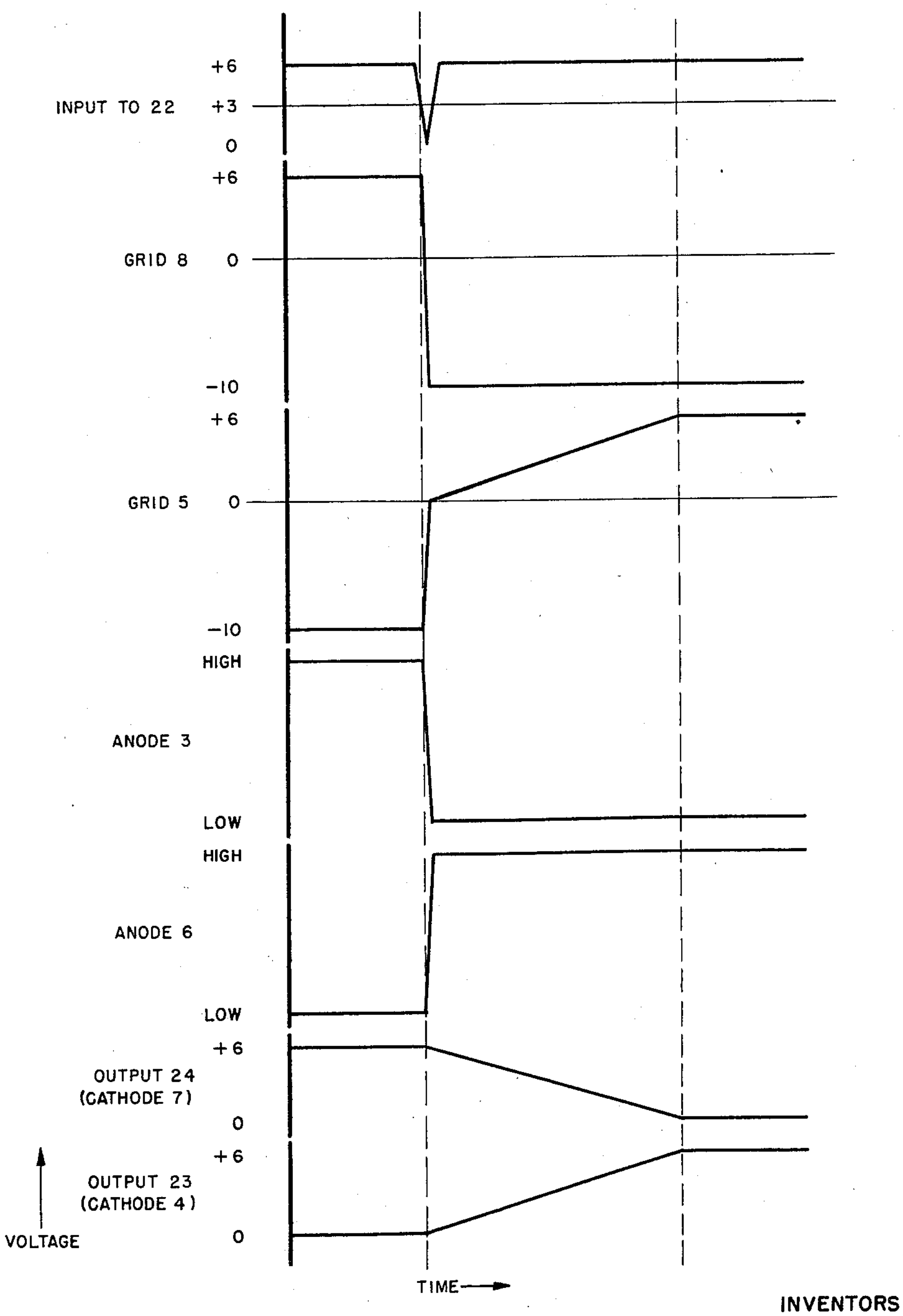
Figure 2 is a graphical illustration of the waveforms at various points of the circuit of Figure 1.

The potentials present at the various electrodes of devices 1 and 2 for the operation just described are shown on Figure 2. Switching of conduction from device 1 to device 2 is initiated by a negative going pulse applied to diode 21.

It is to be pointed out than an input pulse having a 6 volt swing negatively from +6 volts is applied for switching and the resulting output from the flip-flop is a 6 volt swing, positive or negative with reference to the initially non-conducting or conducting state of the device 1 or 2 from which the output is taken, respectively. The output resistance of this circuit is low, and, accordingly, the output from the flip-flop of the instant invention will directly operate a low impedance load such as gates or buffers. Similar flip-flops or other circuits having a threshold of operation between the potential levels assumed by the flip-flop output may also be directly operated by the output of the flip-flop of the instant invention. Of course, the flip-flop components and potentials utilized may be selected to provide the desired potential levels of output and input.

A modification of the circuit of Figure 1 is shown in Figure 3 where the output clamping diodes 27 and 28 of Figure 1 are replaced by a piece of Thyrite 31 connected between the output line 23 and the lower clamping potential, ground, and the output clamping diodes 29 and 30 of Figure 1 are replaced by a piece of Thyrite 32 connected between the output line 24 and the lower clamping potential, ground. The behavior of Thyrite of changing its resistance with a change in applied voltage effects an operation of the circuit of Figure 3 to be almost identical with the operation of the circuit of Figure 1. Accordingly, the graphical illustration of Figure 2 may be consulted for a summary of waveforms existing at the corresponding points of the circuit of Figure 3.

A simplification of the circuit of Figures 1 or 3 is possible wherein a single condenser connected between the cathodes 4 and 7 replaces the two condensers 25 and 26. The behavior of the circuits of Figures 1 and 3 remains substantially the same with this simplification.

A transistor version of the invention is shown in Figure 4. As shown the device 101 is an NPN transistor having an electron collecting electrode or collector 103, an electron emitting electrode or emitter 104 and a control electrode or base 105, and device 102 is also an NPN transistor comprising an electron collecting electrode or collector 106 an electron emitting electrode or emitter 107 and a control electrode or base 108. These devices are connected into a circuit similar to that shown in Figure 1 with the components in general similar and similarly numbered as to the last two digits.

The operation of the circuit of Figure 4 is essentially the same as the operation described in connection with Figure 1. If device 102 is initially conducting, a negative going input pulse applied to diode 122 will be directed to base 108 of the device 102 driving device 102 to cut-off. Capacitor 126 bypassing the emitter resistor 111 to ground permits of a rapid cut-off of device 102. A sudden rise in potential of collector 106 results which drives the base 105 of device 101 positive causing device 101 to come into conduction and further driving device 102 to cut-off. Outputs 122 and 123 are clamped by diodes 127 and 128 and 129 and 130, respectively, and are shown as being set for an output between 0 and +6 volts. The waveforms in Figure 2 are applicable to the operation of the circuit of Figure 4.

It is to be understood that while NPN transistors are illustrated in Figure 4, PNP transistors could be substituted by changing the polarities of the potential sources. The circuit of Figure 4 may be modified in the manner shown in connection with Figure 3, by replacing clamping diodes 127 and 128 with a piece of Thyrite connected to the lower clamping potential and by replacing clamping diodes 129 and 130 with a piece of Thyrite connected to this lower clamping potential. The simplication described hereinabove is also applicable to the circuit of Figure 4 or the modification thereof wherein the two condensers connected respectively to the transistor emitters are replaced by a single condenser interconnecting these emitters.

While but a few particular embodiments of this invention have been shown and described, it will, of course, be understood that various modifications may be made without departing from the spirit of the invention.

What we claim as new and desire to secure by Letters Patent is:

1. A bistable circuit comprising two devices each having first and second electrodes and a control electrode, a network connecting the first electrode of each device with the control electrode of the other, means for storing electrical energy connected to one of said second electrodes, clamping means connected to said last named second electrode, and an output connected to said last named second electrode, said clamping means comprising two diodes oppositely connected between said last named second electrode and different sources of reference potential.

2. A bistable circuit comprising two devices each having first and second electrodes and a control electrode, a network connecting the first electrode of each device with the control electrode of the other, means for storing electrical energy connected to said second electrodes, clamping means connected to said second electrodes, and an output connected to one of said second electrodes, said clamping means comprising two diodes for each of said second electrodes oppositely connected between the respective second electrode and two different sources of reference potential, respectively.

3. A bistable circuit comprising two devices each having first and second electrodes and a control electrode, a network connecting the first electrode of each device with the control electrode of the other, means for storing electrical energy connected to said second electrodes, clamping means connected to said second electrodes, and an output connected to each of said second electrodes, said clamping means comprising two diodes for each of said second electrodes oppositely connected between the respective second electrode and two different sources of reference potential, respectively.

References Cited in the file of this patent

UNITED STATES PATENTS

| | | |
|---|---|---|
| 2,456,026 | Shenk et al. | Dec. 14, 1948 |
| 2,456,089 | Shenk et al. | Dec. 14, 1948 |
| 2,540,551 | Shenk et al. | Feb. 6, 1951 |
| 2,622,212 | Anderson et al. | Dec. 16, 1952 |
| 2,636,985 | Weissman | Apr. 28, 1953 |
| 2,710,913 | Sherertz | June 14, 1955 |